United States Patent
Bryan et al.

(10) Patent No.: US 11,826,658 B2
(45) Date of Patent: Nov. 28, 2023

(54) ADAPTIVE GAMING PERFORMANCE SCORES

(71) Applicant: Dell Products L.P., Round Rock, TX (US)

(72) Inventors: Rex W. Bryan, Round Rock, TX (US); Sajjad S. Ahmed, Austin, TX (US); Karun P. Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 17/377,585

(22) Filed: Jul. 16, 2021

(65) Prior Publication Data

US 2023/0019624 A1    Jan. 19, 2023

(51) Int. Cl.
  *A63F 13/79*   (2014.01)
  *G06N 20/00*   (2019.01)
  *A63F 13/67*   (2014.01)
  *A63F 13/46*   (2014.01)

(52) U.S. Cl.
  CPC .............. *A63F 13/79* (2014.09); *A63F 13/46* (2014.09); *A63F 13/67* (2014.09); *G06N 20/00* (2019.01)

(58) Field of Classification Search
  None
  See application file for complete search history.

(56) References Cited

U.S. PATENT DOCUMENTS

| | | | |
|---|---|---|---|
| 9,195,815 B2 | 11/2015 | Choong et al. | |
| 10,649,875 B2 | 5/2020 | Vichare et al. | |
| 11,213,759 B1* | 1/2022 | Pichaimurthy | A63F 13/798 |
| 2012/0283021 A1* | 11/2012 | Riego | A63F 13/12 463/42 |
| 2016/0067612 A1* | 3/2016 | Ntoulas | A63F 13/335 463/29 |
| 2018/0001205 A1* | 1/2018 | Osman | A63F 13/67 |
| 2018/0012454 A1* | 1/2018 | Thirumaleshwar | G07F 17/34 |
| 2019/0192977 A1* | 6/2019 | Eatedali | A63F 13/35 |
| 2019/0217203 A1* | 7/2019 | Ryan | A63F 13/79 |
| 2019/0329138 A1* | 10/2019 | Panesar | A63F 13/46 |
| 2020/0401222 A1* | 12/2020 | Wisbey | H04R 5/033 |

* cited by examiner

*Primary Examiner* — Jason T Yen
(74) *Attorney, Agent, or Firm* — Larson Newman, LLP (57) ABSTRACT

An information handling system includes a memory to store data associated with metrics of an individual and gaming performance metrics, and a processor. The processor correlates the metrics of an individual with the gaming performance metrics. Based on the correlation, the processor creates a gaming performance score. The processor determines changes to implement based on the gaming performance score. When the changes are implemented, the changes improve the gaming performance score. The processor provides the changes to the individual in a non-intrusive manner.

19 Claims, 5 Drawing Sheets

ADAPTIVE GAMING PERFORMANCE SCORES

FIELD OF THE DISCLOSURE

The present disclosure generally relates to adaptive gaming performance scores in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory to store data associated with metrics of an individual and gaming performance metrics, and a processor. The processor may correlate the metrics of an individual with the gaming performance metrics. Based on the correlation, the processor may create a gaming performance score. The processor may determine changes to implement based on the gaming performance score. When the changes are implemented, the changes may improve the gaming performance score. The processor may provide the changes to the individual in a non-intrusive manner.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
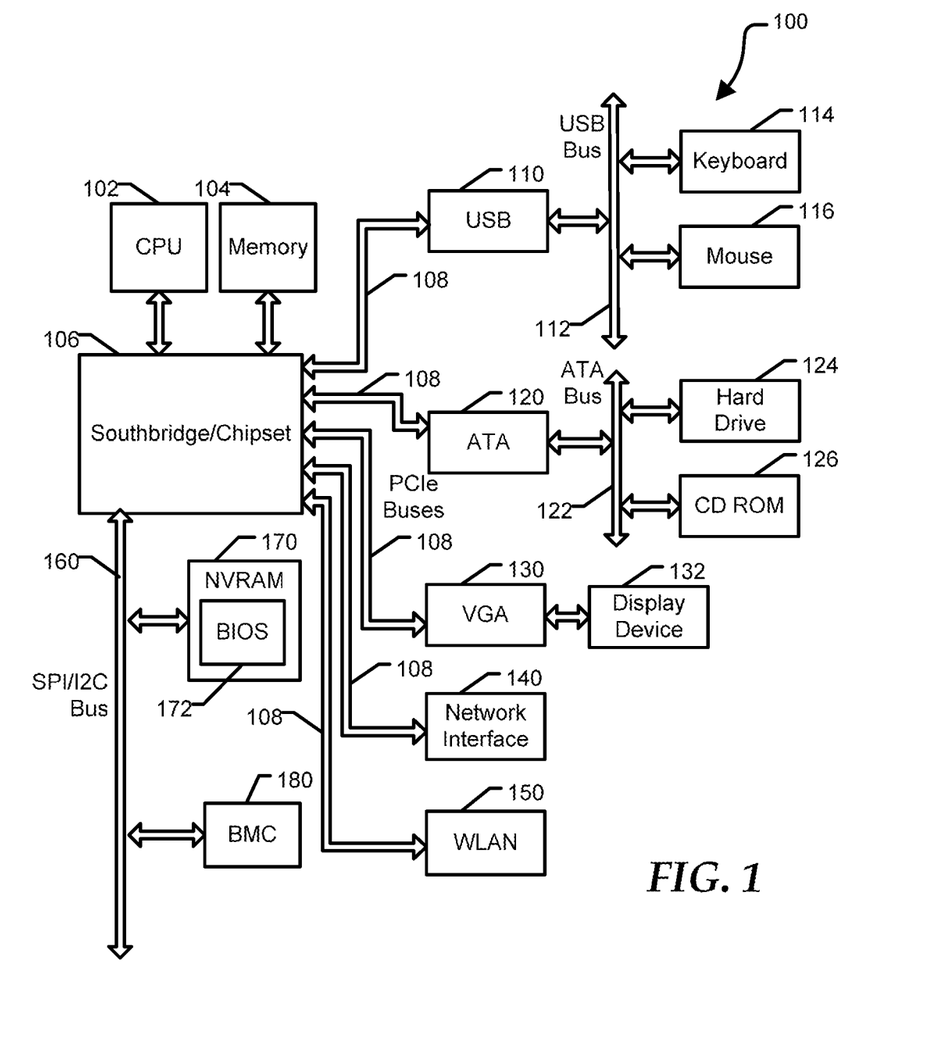
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
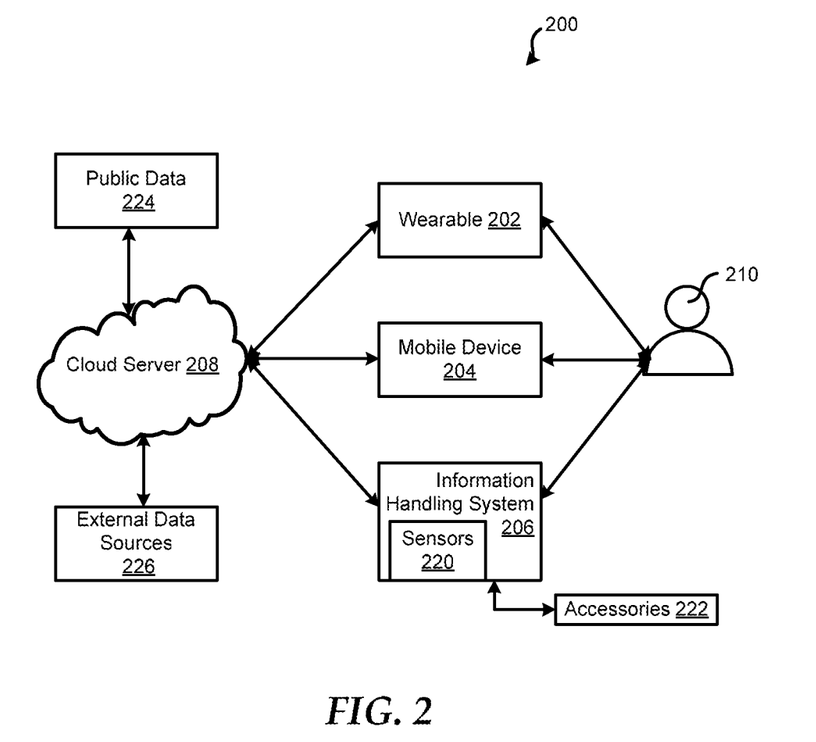
FIG. 2 is a diagram of a portion of a system according to at least one embodiment of the present disclosure.

In an example, information handling system 100 may be any suitable device including, but not limited to, wearable 202, mobile device 204, information handling system 206, and cloud server 208 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of a system 200 according to at least one embodiment of the present disclosure. System 200 includes a wearable device 202, a mobile device 204, an information handling system 206, and a cloud server 208. In an example, a user 210 may utilize wearable device 202, mobile device 204, and information handling system 206 in any suitable manner as described below. Information handling system 206 includes one or more sensors 220, and the information handling system may communicate with one or more accessories 222. While only a single information handling system 206 is shown in FIG. 2, system 200 may include any suitable number of information handling systems associated with individual or user 210. For example, one information handling system may be a work computer for individual 210 and another may be a gaming computer for the individual. Cloud server 208 may receive public data 224 and may communicate with one or more external data sources 226. In certain examples, system 200 may include any additional number of components without varying from the scope of this disclosure.

In an example, an individual may utilize any component in system 200, such as information handling system 206 and mobile device 204, to play a computer game. The computer game may be any suitable game such as an online game or a game locally on information handling system 206. In certain examples, individuals, or gamers, may be categorized into different gaming levels. For example, a gamer may select or be assigned one of any suitable number of gaming levels including, but not limited to, a beginner/novice level, an intermediate level, and an expert/advanced level. In a particular gaming environment, the individual/gamer may select the gaming level based solely on personal choice and not actual past gaming metrics or any predictions of future performance of the gamer. However, an individual may select a gaming level above the actual skill level of the individual. In this situation, the individual or others teamed up with the individual in a game may be frustrated that the individual cannot match the level of the selected level. In an example, information handling system 206 may be improved by a determination of gaming performance score, which in turn may be linked or associated to a game skill level. In this example, the determined gaming performance score may enable the individual to perform the best within a particular game.

In certain examples, any suitable data sources may gather data associated with individual 210. The suitable data sources may include, but are not limited to, wearable 202, mobile device 204, sensors 220 of information handling system 206, accessories 222 of the information handling system, public data 224, and external data sources 226. In an example, these data sources may continually collect the data and may provide the data to cloud server 208 at any suitable interval. The collected or gathered data may be any suitable data that may affect how individual 210 may perform in a game or how the individual performs in the game. For example, the data may include, but is not limited to, physiologic exposures of the individual, cognitive/workload measurements, environmental measurements, information handling system measurements, and gaming performance metrics.

During operation of wearable device 202, mobile device 204, and information handling system 208, these devices may continually gather any suitable data associated with individual 210. In an example, the gathered data may indicate actions or events that may affect how individual 210 may perform in a gaming session. For example, the gathered information may include, but is not limited to, physiological exposures or measurements, cognitive/workload measurements, environmental measurements, and system measurements of information handling system 206.

In an example, physiological measurements may be any suitable measurements of individual 210 including, but not limited to, heart rate, heart rate variability, eye blink rate, eye blink duration, blink latency, pupil dilation, blood oxygenation, fNIRs, galvanic skin response, EEG, respiratory rate, facial expression/sentiment analysis, postural changes, sitting duration, and activity duration and distribution. The physiological measurements may be gathered by any suitable device including, but not limited to, wearable device 202 and sensors 220. For example, wearable device 202 and mobile device 204 may gather data associated with heart rate and variability, blood oxygenation, fNIRs, EEG, respiratory rate, or the like. Sensor 220, such as a camera, may be utilized to gather the eye blink rate, eye blink duration, blink latency, pupil dilation, facial expression/sentiment analysis, postural changes, sitting duration, and activity duration and distribution, or the like.

In certain examples, environmental measurements may be any suitable measurements of the area around individual 210. For example, environmental measurements may include, but are not limited to, temperatures, air quality, UV index, light magnitude and composition, oxygen and carbon dioxide levels, and sound levels. In an example, public data source 224 may provide any suitable environmental measurements including, but not limited to, UV index, air quality, outdoor temperatures, historic data, and building or location data. In certain examples, sensors 220 may gather ambient temperatures, oxygen levels, carbon dioxide levels, and indoor light brightness and composition.

Wearable device 202 and mobile device 204 may also gather data that may be a combination of environmental and physiological data including, but not limited to, locations of individual 210, proximity of individual to information handling system 206, motion of the individual, and compass information. Similarly, sensors 220 and accessories 222 may gather data related to keyboard/input device activity, proximity/presence detection, motion, location, application usage data, and camera-based posture detection/estimation of individual 210. In an example, accessories 222 may include, but are not limited to, a sit/stand desk controller, a dock, a monitor, and a chair sensor.

In an example, information handling system 206 may gather any suitable system measurements. For example, the system measurements may include, but are not limited to, human interface devices (HID) activity and variability, simultaneous tasks being performed by a processor in addition to gaming tasks, and non-game related notifications.

Physical risk factors, cognitive workload, environmental risk factors combine with APIs and historical gaming performance to calculate performance score. System evaluate these conditions to determine if any may be limiting individual 210 gaming performance and make recommendations for future sessions that may improve performance.

Information handling system 206 may gather data associated with a gaming session of individual 210. In an example, information handling system 206 may utilize an application programming interface (API) to gather the data from the gaming session. For example, the API may access a leaderboard in the game, a score on solo game, or any other information from game. In an example, the information from a current gaming session may include any suitable key performance indicators (KPIs) provided by the game. For example, the KPIs may include, but are not limited to, a current level of individual 210 in the game, and other statistics from the game. In certain examples, the statistics may be recorded by the gaming application or from captured video. For example, a device may receive data from a buffer/frame and the device may run video analysis on the received data.

In response to the data being gathered by all available sources, the gathered data may be provided to information handling system 206 and server 208. In an example, data may be provided to server 208 from wearable device 202, mobile device 204, information handling system 206, public data sources 224, and external data sources 226. In an example, server 208 may perform any suitable operations to assign/update a gaming performance score for individual 210 based on the received data. Server 208 may store the received data in a memory device associated with the server, such as a local memory device. As stated above, the data may be any suitable data associated with individual 210 and collected from game play on information handling system 206. For example, individual 210 may be monitored via sensors 220, which may gather data associated with the posture, lack of motion, eye and head tracking, facial expression, sign of fatigue or aggression, or the like. One server 220 may be an audio sensor to detect a temperament of individual 210 based on the speech of the individual. In an example, other sensors 220 may gather data for a travel response of the keyboard or voice pattern analysis. A component of information handling system 206 may analyze a screen frame or associated metadata for the video displayed for a game.

In an example, server 208 may provide the received data to a machine learning (ML) system, which in turn may calculate or determine a gaming performance score for individual 210. The ML system includes an input layer to receive the data, one or more hidden layers to perform different operations on the data, and an output layer to provide a gaming performance score for individual 210. In an example, the hidden layers of the ML system perform may overlay data from sensors 220 on the video frames to determine key user metrics. In an example, the key user metrics may be any suitable metrics including, but not limited to, stress, fatigue, gaming skills, hand eye coordination, and individual 210 analytical/tactical/strategical skills. Based on the determined metrics, the hidden layers of ML system may assign a gaming performance score for individual 210.

In certain examples, the ML system of server 208 may continually or periodically receive new data for individual 210. ML system may combine the new data with the historical data for individual 210 to change or update the gaming performance score for the individual. In an example, the gaming performance score may improve or degrade over time as individual 210 engages in more gaming activities. The gaming performance score may be a hybrid performance score based on the score being generated from the combination of the physiologic measurement data, the cognitive/workload measurement data, the environmental measurement data, the information handling system measurement data, and the gaming performance metrics data. The gaming performance score may be utilized to obtain a skill level for the individual, and the skill level may be matched to a group the user joins in an online game.

In an example, server 208 may utilize the gaming performance score determine whether an update is needed to rules for individual 210. In an example, the rules may be any suitable limitations or controls associated with individual 210. For example, the rules may include, but are not limited to, parental controls, permissions to join certain gaming groups, time for gaming, and pausing or turning off the gaming access. In an example, the rules may be updated based on a calculation of a stress level or health of individual 210, and the rules may be utilized to decrease the stress level and improve the health of individual 210. For example, the time limit rules may cause individual 210 to take breaks to relax individual 210 eyes, have the individual move around and stretch. Server 208 may provide the updated rules to information handling system 206, and the updated rules may be stored in a memory of the information handling system. While the calculation of the gaming performance score has been described with respect to server 208, one of ordinary skill in the art would recognize that these operations may be performed in information handling system 206 without varying from the scope of this disclosure.

As stated above, information handling system 206 may received the data associated with individual 210. Information handling system 206 may perform any suitable operations to determine whether individual 210 may make one or more changes to improve his or her gaming scores. For example, information handling system 206 may provide the received data to a machine learning (ML) system, which in turn may calculate or determine a one or more changes that may be implemented to improve the gaming scores of individual 210. The ML system includes an input layer to receive the data, one or more hidden layers to perform different operations on the data, and an output layer to provide a list of changes to be implemented to improve a gaming score for individual 210.

In an example, any rules assigned to individual 210 and the gathered data may be inputted to the ML system of information handling system 206. During a training session and/or during ongoing operations of the hidden layers of ML system, the hidden layers may learn or associate or correlate different sets of behavior data to different gaming performance scores of individual 210. For example, ML system of information handling system 208 may infer or calculate that as the gathered data indicates individual 210 is stressed or tired, the gaming performance score of the individual may decrease.

As new data is analyzed by hidden layers of ML system in information handling system 208, the hidden layers may perform one or more operations to determine whether changes may be implemented to improve a gaming score of individual 210. For example, the hidden layers may compare the received data and KPIs of a gaming session to historical data and know performance reducing behavior data. In response to this comparison the ML system may identify conditions that are having a negative impact on the gaming scores of individual 210.

If the ML system determines that the KPIs of a gaming session have decrease, the ML system may provide a list of condition changes that may be made to improve the gaming score for individual 210. For example, the changes may include a suggestion that individual 210 take a break from playing the game, suggest hardware improvements for information handling system 210, or the like.

In an example, individual suggested changes or a list of suggested changes may be provided to individual 210 in any suitable non-intrusive manner. For example, the suggestions may be provided after a current game or gaming session has ended to prevent the suggestion from being disruptive to individual 210. In certain examples, a suggestion or list of suggestions notification may be pushed to a currently active device, such as wearable device 202, mobile device 204, or information handling system 206. These notifications may be presented via a pop-up, a vibration, an audible alert, or the like. In an example, the suggest may be automatically placed on a calendar, such as automatically scheduling breaks, a change of activity, change in focus time, or the like. Other notification may include, but are not limited to, alerts provided to other players in a teaming environment via a chat or prompt.

In certain examples, device performance changes may be automatically made in information handling system 206 to bring the notification to the attention of individual 210. For example, the device performance changes may include, but are not limited to, auto-dimming of a screen, auto-slowdown of information handling system 206, actuation of feedback devices, such as haptic devices, recommended activity changes, or the like. In an example, the activity change may include recommending that individual 210 get up from information handling system 206 and walk around. While the calculation of the changes has been described with respect to information handling system 206, one of ordinary skill in the art would recognize that these operations may be performed in server 208 without varying from the scope of this disclosure.

In an example, information handling system 206 and server 208 may combine to dynamically adjust suggested interventions in real-time based on available data aggregation, historic data, and learned, via ML system, effective responses from individual 210. In certain examples, the suggestions may be performed at any suitable time. For example, during normal conditions, the notifications may be provided in real-time. However, the notifications may be delayed or modified if the gathered data indicates that individual 210 should not have an interruption. For example, the data may indicate individual 210 is performing a high level of keyboard, mouse or other HID activity in a game, that the individual's calendar indicates a meeting is about to start and the individual will walk to the meeting, or the like.

Figure 3:
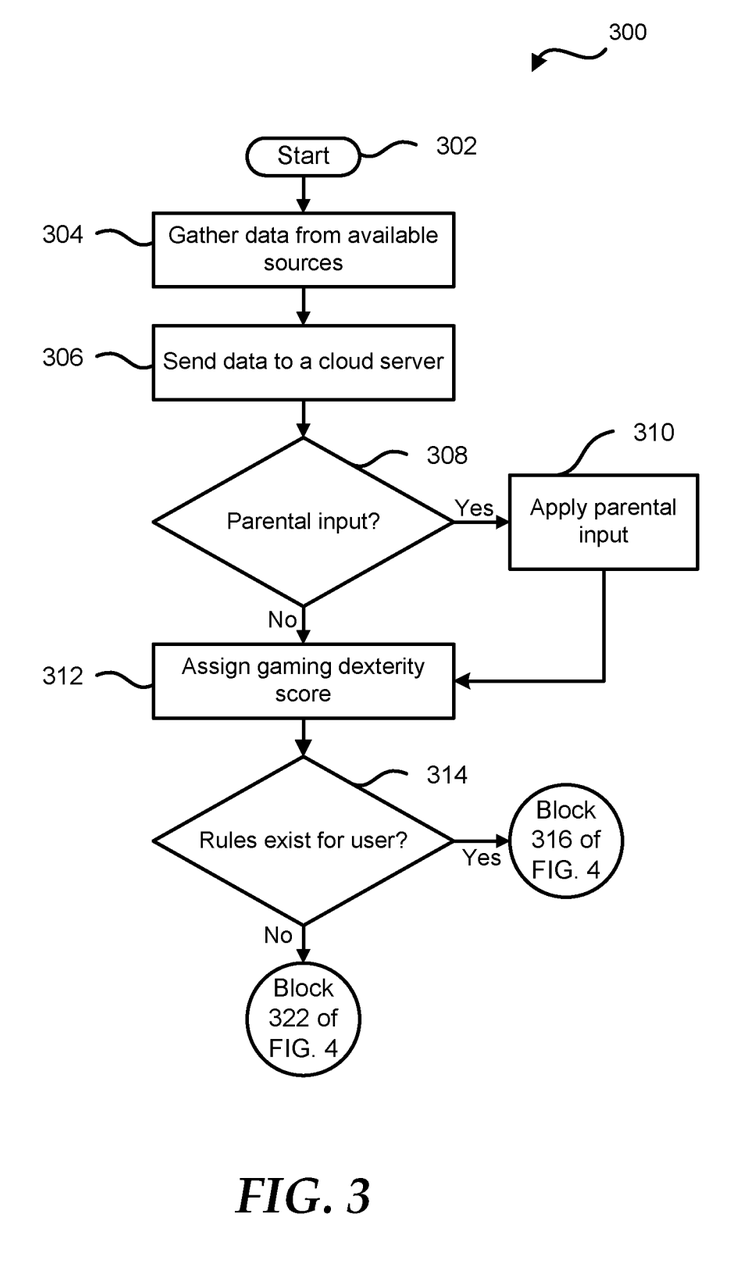
FIGS. 3 and 4 combine for a flow diagram of a method for adaptively updating a gaming performance score according to at least one embodiment of the present disclosure.
Figure 4:
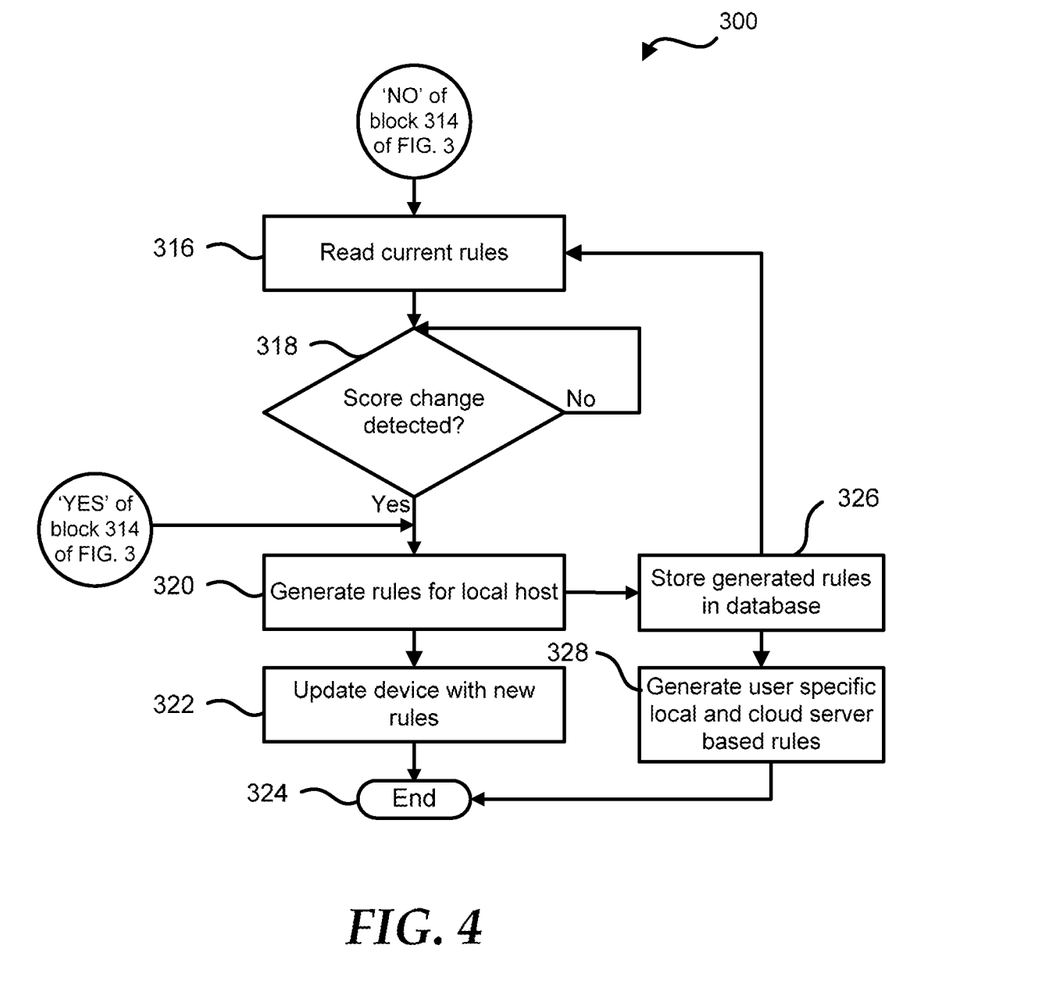

FIGS. 3 and 4 illustrate a flow diagram of a method 300 for adaptively updating a gaming performance score according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by one or components of system 200 depicted in FIG. 2 including, but not limited to, information handling system 206 and cloud server 208, or any other type of system, controller, device, module, processor, or any combination thereof, operable to employ all, or portions of, the method of FIG. 3.

At block 304, data is gathered from all available sources. In an example, the sources may include, but are not limited to, a leaderboard/game API, health devices, public data sources, accessories/peripherals, sensors, and biometric wearables. At block 306, the data is sent to a cloud server. At block 308, a determination is made whether a parental input has been received. If a parental input has been received, the parental input is applied at block 310 and the flow continues at block 312. In an example, the parental input may control a length of time for individual, violence level, or the like. If a parental input has not been received, a gaming dexterity score is assigned at block 312. At block 314, a determination is made whether rules exist for a user of the information handling system. If rules exist for a user, the flow continues at block 316 in FIG. 4. If no rules exist for the user, the flow continues at block 322 of FIG. 4.

Referring now to FIG. 4, current rules are read at block 316. In an example, the rules may be any suitable limitations or controls associated with an individual. For example, the rules may include, but are not limited to, parental controls, permissions to join certain gaming groups, and pausing or turning off the gaming access. At block 318, a determination is made whether a score change has been detected. In response to a score change being detected, rules for a local host are generated at block 320. At block 322, the device is updated with the new generated rules, and the flow ends at block 324. At block 326, the generated rules are stored in a database. In response to the generated rules being stored in the database, the flow continues at both block 316 and block 328. At block 328, user specific local and server based rules are generated at block 328, and the flow ends at block 324.

Figure 5:
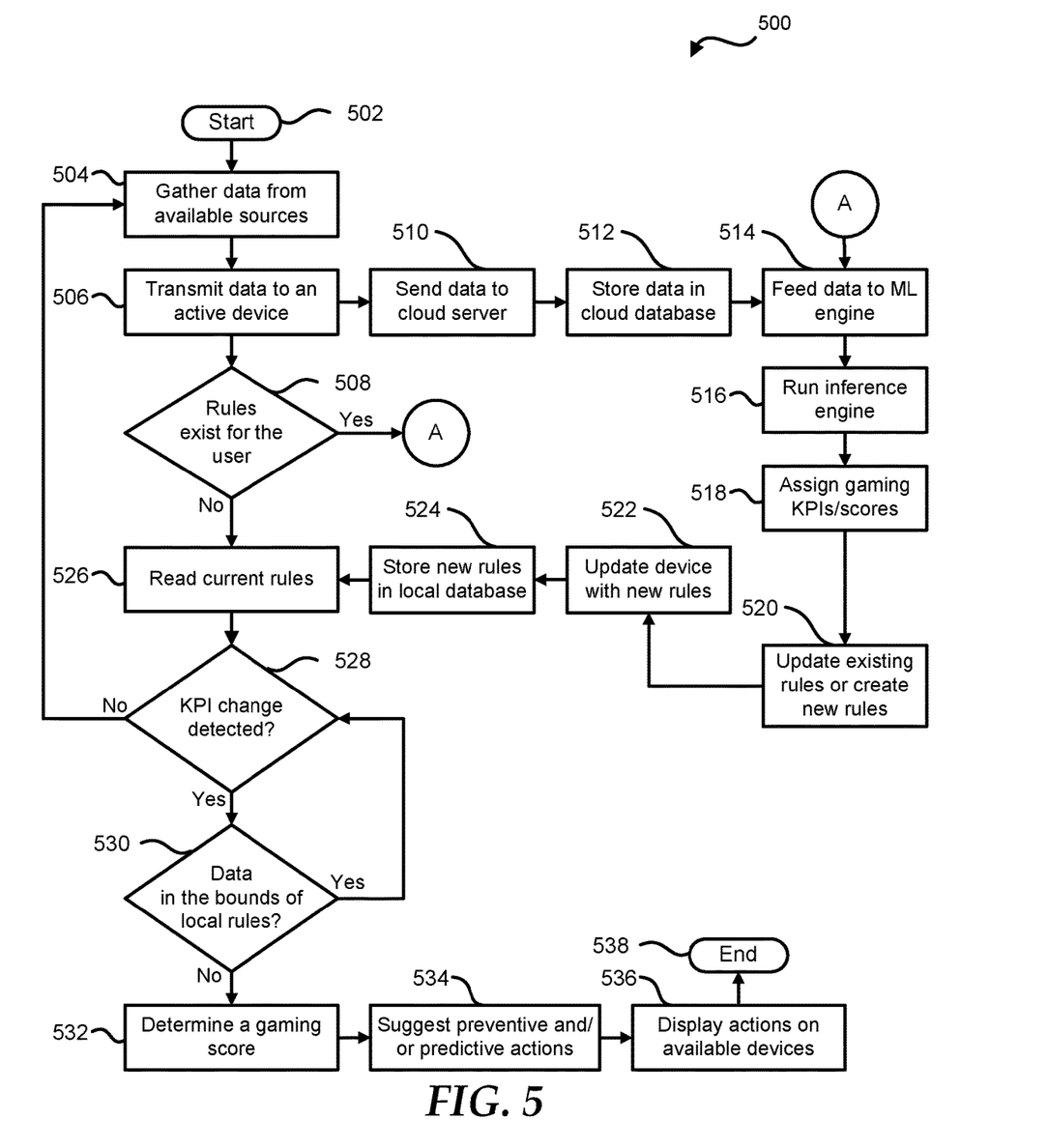
FIG. 5 is a flow diagram of a method for adaptively updating a gaming performance score according to at least one embodiment of the present disclosure.

FIG. 5 illustrates a flow diagram of a method 500 for adaptively updating a gaming performance score according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by one or components of system 200 depicted in FIG. 2 including, but not limited to, information handling system 206 and cloud server 208, or any other type of system, controller, device, module, processor, or any combination thereof, operable to employ all, or portions of, the method of FIG. 5.

At block 504, data is gathered from all available sources. In an example, the available sources may include, but are not limited to, a wearable device, a mobile device, an information handling system, public data sources, and external data sources. At block 506, the data is transmitted to an active device. In response to the data being transmitted to the active device, the flow continues at both block 508 and block 510. At block 508, a determination is made of whether rules exist for the user. In response to rules existing for the user, the flow continues at block 514. If rules do not exist for the user, the flow continues at block 526.

At block 510, the data is sent to a cloud server. At block 512, the data is stored in a cloud database. At block 514, the data is fed to a machine learning (ML) engine. At block 516, the interface engine is run. In response to the interface engine being run, gamming key performance indicators (KPIs)/scores are assigned at block 518. In an example, a KPI may be any suitable aspect of a game, such as a change of a mouse movement above a threshold level of change. At block 520, existing rules are updated or new rules are created. In an example, the rules may be any suitable limitations or controls associated with the individual. For example, the rules may include, but are not limited to, parental controls, permissions to join certain gaming groups, time for gaming, and pausing or turning off the gaming access. At block 522, devices are updated with new rules. In an example, the operations of blocks 512-522 may be performed in any suitable device including, but not limited to, a cloud infrastructure device.

At block 524, new rules are stored in a local database. At block 526, current rules for a device are read. At block 528, a determination is made whether a KPI change has been detected. If KPI changes are not detected, the flow continues as stated above at block 504. If KPI changes are detected, a determination is made whether the data is within the bounds of local rules at block 530.

In response to the data not being within the bounds of local rules, a gaming score is determined at block 532. At block 534, preventive and/or predicative actions are suggested. In certain examples, a suggestion or list of suggestions notification may be pushed to a currently active device, such as a wearable device, a mobile device, or an information handling system. These notifications may be presented via a pop-up, a vibration, an audible alert, or the like. In an example, the suggest may be automatically placed on a calendar, such as automatically scheduling breaks, a change of activity, change in focus time, or the like. Other notification may include, but are not limited to, alerts provided to other players in a teaming environment via a chat or prompt.

At block 536, actions are displayed on available devices, and the flow ends at block 538. These action may be presented as notifications via a pop-up, a vibration, an audible alert, or the like. In an example, the suggest may be automatically placed on a calendar, such as automatically scheduling breaks, a change of activity, change in focus time, or the like. Other notification may include, but are not limited to, alerts provided to other players in a teaming environment via a chat or prompt. In an example, blocks 504-508 and blocks 526-536 may be performed in any suitable device including, but not limited to, an edge infrastructure device.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store data associated with metrics of an individual and gaming performance metrics; and
   a processor to communicate with the memory, the processor to:
      correlate the metrics of the individual with the gaming performance metrics;
      create a gaming performance score based on the correlation;
      determine changes to implement based on the gaming performance score, wherein the changes, when implemented, improve the gaming performance score; and
      automatically execute device performance changes in the information handling system to provide the changes in a non-intrusive manner; and
   a machine learning system including:
      an input layer to receive the data associated with the metrics of the individual and the gaming performance metrics;
      one or more hidden layers to correlate the metrics of the individual with the gaming performance metrics, and create the gaming performance score based on the correlation; and
      an output layer to provide the gaming performance score.

2. The information handling system of claim 1, wherein the metrics include physiological measurement data, cognitive measurement data, environmental measurement data, and system measurement data.

3. The information handling system of claim 1, wherein prior to the creation of the gaming performance score, the processor further to:
   compare the gaming performance metrics to previous gaming performance metrics; and
   in response to the gaming performance metrics being lower than the previous gaming performance metrics, determine that the gaming performance metrics need to be improved.

4. The information handling system of claim 1, wherein based on the created gaming performance score, the processor to:

match the individual to a group of gamers for an online gaming session.

5. The information handling system of claim 1, wherein the metrics indicate fatigue of the individual.

6. The information handling system of claim 1, wherein the correlation further includes the hidden layers to correlate the metrics of the individual and the gaming performance metrics with historical metrics.

7. The information handling system of claim 1, wherein the non-intrusive manner includes the processor to:
provide the change in a notification on a display screen of the information handling system after an execution of a current online game is completed.

8. A method comprising:
storing data associated with metrics of an individual and gaming performance metrics in a memory of an information handling system; and
correlating, by a processor of the information handling system, the metrics of the individual with the gaming performance metrics;
creating, by the processor, a gaming performance score based on the correlation;
determining changes to implement based on the gaming performance score, wherein the changes, when implemented, improve the gaming performance score;
automatically executing device performance changes in the information handling system to provide the changes in a non-intrusive manner;
receiving, at an input layer of a machine learning system, the data associated with the metrics of the individual and the gaming performance metrics;
correlating, by one or more hidden layers of the machine learning system, the metrics of the individual with the gaming performance metrics, and create the gaming performance score based on the correlation; and
providing, by an output layer of the machine learning system, the gaming performance score.

9. The method of claim 8, wherein the metrics include physiological measurement data, cognitive measurement data, environmental measurement data, and system measurement data.

10. The method of claim 8, wherein prior to the creating of the gaming performance score, the method further comprises:
comparing the gaming performance metrics to previous gaming performance metrics; and
in response to the gaming performance metrics being lower than the previous gaming performance metrics, determining that the gaming performance metrics need to be improved.

11. The method of claim 8, wherein based on the created gaming performance score, the method further comprises:
matching the individual to a group of gamers for an online gaming session.

12. The method of claim 8, wherein the metrics indicate fatigue of the individual.

13. The method of claim 8, wherein the correlating further includes:
correlating the metrics of the individual and the gaming performance metrics with historical metrics.

14. The method of claim 8, wherein the non-intrusive manner includes:
providing the change in a notification on a display screen of the information handling system after an execution of a current online game is completed.

15. A method comprising:
storing data associated with metrics of an individual and gaming performance metrics in a memory of an information handling system; and
correlating, by a processor of the information handling system, the metrics of the individual with the gaming performance metrics and with historical metrics;
creating, by the processor, a gaming performance score based on the correlation;
determining changes to implement based on the gaming performance score, wherein the changes, when implemented, improve the gaming performance score;
automatically executing device performance changes in the information handling system to provide a notification of the change on a display screen of the information handling system after an execution of a current online game is completed in a non-intrusive manner;
receiving, at an input layer of a machine learning system, the data associated with the metrics of the individual and the gaming performance metrics;
correlating, by one or more hidden layers of the machine learning system, the metrics of the individual with the gaming performance metrics, and create the gaming performance score based on the correlation; and
providing, by an output layer of the machine learning system, the gaming performance score.

16. The method of claim 15, wherein the metrics include physiological measurement data, cognitive measurement data, environmental measurement data, and system measurement data.

17. The method of claim 15, wherein based on the created gaming performance score, the method further comprises:
matching the individual to a group of gamers for an online gaming session.

18. The method of claim 15, wherein prior to the creating of the gaming performance score, the method further comprises:
comparing the gaming performance metrics to previous gaming performance metrics; and
in response to the gaming performance metrics being lower than the previous gaming performance metrics, determining that the gaming performance metrics need to be improved.

19. The method of claim 15, wherein the metrics indicate fatigue of the individual.

* * * * *